(12) United States Patent
Ebong

(10) Patent No.: US 11,705,161 B2
(45) Date of Patent: Jul. 18, 2023

(54) METHODS, DEVICES, AND SYSTEMS FOR VIDEO SEGMENTATION AND ANNOTATION

(71) Applicant: WEV LABS, LLC, Berkeley Lake, GA (US)

(72) Inventor: Ben Ebong, Berkeley Lake, GA (US)

(73) Assignee: WEV LABS, LLC, Berkeley Lake, GA (US)

( * ) Notice: Subject to any disclaimer, the term of this patent is extended or adjusted under 35 U.S.C. 154(b) by 0 days.

(21) Appl. No.: 17/491,990

(22) Filed: Oct. 1, 2021

(65) Prior Publication Data

US 2022/0101885 A1 Mar. 31, 2022

Related U.S. Application Data

(63) Continuation of application No. PCT/US2021/051909, filed on Sep. 24, 2021.

(60) Provisional application No. 63/083,248, filed on Sep. 25, 2020.

(51) Int. Cl.

| G11B 27/34 | (2006.01) |
| G06V 20/40 | (2022.01) |
| G11B 27/036 | (2006.01) |
| H04N 5/272 | (2006.01) |
| G06F 16/78 | (2019.01) |
| G11B 27/06 | (2006.01) |
| H04N 5/265 | (2006.01) |

(Continued)

(52) U.S. Cl.
CPC .............. *G11B 27/34* (2013.01); *G06F 16/71* (2019.01); *G06F 16/7867* (2019.01); *G06V 20/49* (2022.01); *G11B 27/036* (2013.01); *G11B 27/06* (2013.01); *G11B 27/102* (2013.01); *H04N 5/265* (2013.01); *H04N 5/272* (2013.01)

(58) Field of Classification Search
CPC ....... G11B 27/34; G11B 27/036; G11B 27/06; G11B 27/102; G06F 16/71; G06F 16/7867; G06V 20/49; G06V 2201/10; G06V 20/42; H04N 5/265; H04N 5/272; H04N 5/2625
See application file for complete search history.

(56) References Cited

U.S. PATENT DOCUMENTS

| 9,253,533 B1* | 2/2016 | Morgan ........... H04N 21/44222 |
| 2010/0037149 A1* | 2/2010 | Heath .................... G06F 3/0481 |
| | | 715/753 |
| 2011/0185269 A1 | 7/2011 | Finkelstein |

(Continued)

OTHER PUBLICATIONS

ISA/US; International Search Report and Written Opinion for International Patent Application No. PCT/US21/51889 dated Feb. 7, 2022, 7 pages.

(Continued)

*Primary Examiner* — Girumsew Wendmagegn
(74) *Attorney, Agent, or Firm* — NK Patent Law

(57) ABSTRACT

Methods, devices, and systems for segmenting and annotating videos for analysis are disclosed. A user identifies specific moments of the video that provide a teachable moment. A pre-context and a post-context portion of the video surrounding the identified moment are used to create a tile video. One or more tile videos are compiled in a user-defined order to generate a weave video with a specific focus or theme. The generated weave video is shared with one or more users and can be annotated to facilitate teaching and/or discussion.

10 Claims, 24 Drawing Sheets

(51) Int. Cl.
　　*G06F 16/71*　　(2019.01)
　　*G11B 27/10*　　(2006.01)

(56) References Cited

U.S. PATENT DOCUMENTS

| | | |
|---|---|---|
| 2012/0263430 A1 | 10/2012 | Spitzer-Williams |
| 2014/0325568 A1 | 10/2014 | Hoang et al. |
| 2015/0312629 A1 | 10/2015 | Bugajski et al. |
| 2016/0142730 A1 | 5/2016 | Gurbuz |

OTHER PUBLICATIONS

Shih Huang-Chia. "A Survey on Content-aware Video Analysis for Sports." IEEE Transactions on Circuits and Systems for Video Technology, vol. 99, No. 9, Jan. 31, 2017, p. 1-20.

Jondronrgoro, Dian et al. "The Power of Play-Break for Automatic Detection and Browsing of Self-consumable Sport Video Highlights." Oct. 15, 2004. [retrieved on Nov. 16, 2021]. Retrieved from the Internet: <URL: https://dl.acm.org/doi/pdf/10.1145/1026711.1026755> p. 267-274.

* cited by examiner

1

METHODS, DEVICES, AND SYSTEMS FOR VIDEO SEGMENTATION AND ANNOTATION

CROSS-REFERENCE TO RELATED APPLICATIONS

This application is a continuation application of PCT Application No. PCT/US21/51909 filed on Sep. 24, 2021 which claims priority to U.S. Provisional Patent Application No. 63/083,248 filed on Sep. 25, 2020, by WEV Labs, LLC, titled "METHODS, DEVICES, AND SYSTEMS FOR VIDEO SEGMENTATION AND ANNOTATION," the entire contents of all of which are incorporated by reference herein.

TECHNICAL FIELD

The present invention relates to a server application, a web application, and a client/server infrastructure; and more specifically to methods, devices, and systems for segmenting and annotating videos for analysis.

BACKGROUND

Under existing methods of game-tape analysis for sports teams, games are recorded, and the coaches and players of a team later break down and analyze the game tape to identify both good and bad performance to adjust during training or practice. The current methods of analyzing game tape are slow because of the length of each game, and they often require that game tape analysis be performed at a central location, such as at the practice facility with the whole team gathered. They further make it difficult to segment the game tape in a way that is relevant only to particular aspects of the game.

Accordingly, a need exists for a system that allows game tape to be segmented and annotated into short videos of sporting events for player performance breakdown and analysis.

SUMMARY

The presently disclosed subject matter is directed toward methods, devices, and systems for segmenting and annotating videos for analysis. Such a system for segmenting and annotating videos for analysis is referred to herein as a "weave video system."

The weave video system described herein allows for any interested party that is a user of the weave video system to segment and annotate game tape in any way they see fit to create short, focused clips of the game that allow for analysis around a particular objective or storyline. This process requires no knowledge of video editing or the ability to use complicated video software by the user. The focused clips may be selected and used to tell a particular story or to reinforce a particular theme. Additionally, and importantly, the weave video system allows any users of the system to annotate the video clips with drawings highlighting a particular teaching point meant to be highlighted, as well as to create threaded conversations around the video clips to add a social component.

The weave video system allows, for example, a coach to select teachable moments, referred to as tile videos, from a game tape and create one or more video compilations made up of multiple tile videos, referred to as a weave video. The coach may assign various of the weave videos to various relevant players or groups of players so that each player or group of players receives on their mobile device (through a mobile app) a weave video comprised of only the tile videos relevant to those players or groups of players. The tile videos and weave videos can be annotated by the coach (i.e., the generating user) or the players (i.e., the viewing users). In this way, a discussion around each particular tile video or weave video may be generated by all the players, allowing for team discussion around selected moments of the game. The weave video system allows for one-to-one feedback or group feedback.

DETAILED DESCRIPTION

Figure 1:
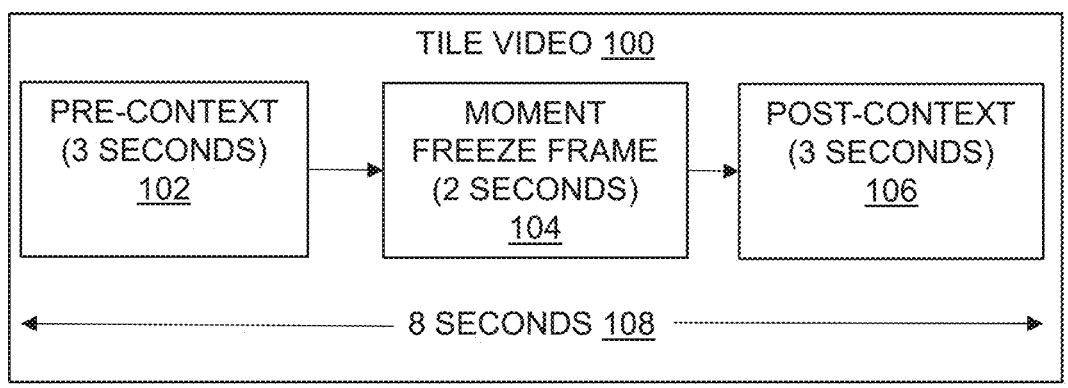
FIG. 1 depicts an exemplary tile video.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. Multiple appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for segmenting and annotating videos for analysis. The embodiments described focus on segmenting and annotating videos of sporting events for player performance analysis and coaching. However, as will be understood by a person skilled in the art, the concepts and principles described herein may be applied in other contexts where video analysis is used for analysis and teaching, for example, training first responders, reviewing speeches, summarizing lengthy events, or the like. As such, the disclosure provided herein is not intended to be limited solely to the sports coaching examples presented.

The methods, devices, and systems for segmenting and annotating videos for analysis described herein provide a practical application in that they allow for real-time, on-the-go analysis of long videos (e.g., multiple-hour videos of sporting events) by creating short, focused clips of the most important moments from the long videos with a simple single click at the moment of interest in the video during video playback. This removes the traditional complexity of video editing and analysis that has previously hindered the video analysis process.

In one embodiment, the weave video system is a client/server architecture wherein a plurality of users may communicate over one or more networks (e.g., wired, wireless, or a combination thereof) using their client device with one of more physical servers. The client device may be a fixed client device such as a workstation and/or personal computer. In other embodiments, the client device may be a mobile client device such as a tablet or a laptop. The server may be implemented as one or more servers including physical servers, virtual servers, servers housed in containers, or the like.

The weave video system allows any user to select a particular moment in a video for later review, analysis and annotation, sharing, and comment. For example, in a video of a basketball game, a user may select a particular moment where a defensive player stole the ball from the opposing team so that the game video can be analyzed for the breakdown in offense that led to the ball being stolen. Based on that particular moment, the weave video system creates a tile video based on that moment that includes pre-context for the moment and post-context for the moment to assist in the video review and analysis.

FIG. 1 depicts an exemplary tile video. Referring to FIG. 1, each tile video 100 comprises a moment 104, a pre-context 102, and a post-context 106. The moment 104 may comprise a stillframe from a video, for example, a video of a sporting event such as a game tape. In some embodiments, the moment is identified by a marker that refers to or otherwise indicates a timestamp in the video. Although the moment 104 is a stillframe from the video, when the tile video 100 is created from the moment, the moment is shown as a freeze frame for a particular amount of time (e.g., 2 seconds). This allows viewers to see the important moment long enough to see the specifics of what is happening at that moment. In some embodiments, the freeze frame of the stillframe may be a different amount of time, which may be pre-determined or set by the user. The pre-context 102 is a pre-determined number of seconds of the video file immediately prior to the moment 104. In some embodiments, the pre-context is the three seconds before the moment 104. In other embodiments, the pre-context may be another amount of time preceding the moment 104. The post-context 106 is a pre-determined number of seconds of the video file immediately subsequent to the moment 104. In some embodiments, the post-context is the three seconds after the moment 104. In other embodiments, the post-context may be another amount of time subsequent the moment 104. In some embodiments, the amount of time that makes up the pre-context and/or the post-context may be set or defined by a user. Thus, the length of the tile video 100 is the total of time of the pre-context 102 and the post-context 106. In some embodiments, therefore, the tile video 100 is eight seconds long (as shown in element 108). Once a tile video is generated, it is stored in memory for later use and/or viewing (e.g., stored locally on a user device or stored remotely on a server).

A user can create multiple tile videos 100 to highlight various moments throughout a particular video. As explained in more detail below, the multiple tile videos 100 can be woven together in any order selected by the user to create a story with a particular theme or focus. For example, if a user wants to analyze all defensive breakdowns during the second half of a college basketball game, the user selects a moment for each particular breakdown during that half, and the system generates a tile video for each of those moments. The user then selects a particular order to compile the tile videos into a weave video based on any number of factors. For example, the order may be a chronological order, or it may be selected based on players such that each player is grouped. In this way, a particular game tape, which may be over two hours long, can be condensed down to only the particular moments that are relevant to a particular teaching objective (e.g., offense, defense, great plays, turnovers, etc.), which may only total three or four minutes of total viewing time.

Figure 2A:
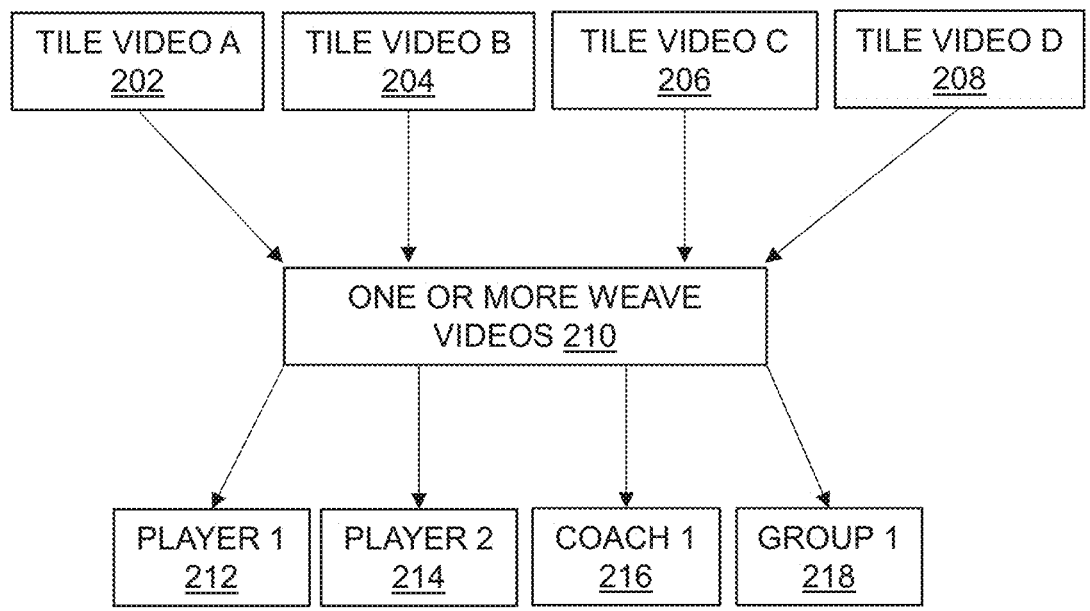
FIG. 2A depicts a chart showing the relationship between tile videos, weave videos, and viewers of the weave videos.

FIG. 2A depicts a chart showing the relationship between tile videos, weave videos, and viewers of the weave videos. As explained in the context of FIG. 1, a user may generate multiple tile videos. Referring to FIG. 2A, assume four tile videos (Tile Video A 202, Tile Video B 204, Tile Video C 206, and Tile Video D 208) have been created. The multiple tile videos are used to generate one or more weave videos 210, where a weave video is an ordered collection or compilation of tile videos. Thus, one or more tile videos are used to generate a weave video, and the weave video comprises multiple tile videos. The tile videos within a weave video may be arranged in any order, which may be specified by the user generating the weave videos. Once a weave video is generated, it is stored in memory for later use and/or viewing (e.g., stored locally on a user device or stored remotely on a server).

As shown in FIG. 2A, each of the one or more weave videos 210 is associated with and/or sent to one or more viewing uses. In some embodiments, the weave videos are sent to the one or more viewing users by sharing them using permissions or other known sharing mechanisms. The viewing users may be anybody associated with the team, for example, the players on the team (e.g., Player 1 212, Player 2 214), the coaches (e.g., Coach 1 216), assistant coaches, and/or trainers. The viewing users may be assigned to one or more groups (e.g., Group 1 218) within the system. For example, a group may be the entire team (e.g., Group 1 218 may be the entire team). In other examples, all the starting players may be grouped together, or all the forwards or guards may be grouped together, etc. Thus, each of the one or more weave videos 210 may be sent to, for example, Player 1 212, Player 2 214, Coach 1 216, Group 1 218, or any combination thereof. Weave videos 210 may be sent or shared in a one-to-one relationship or a one-to-many relationship. When a weave video for a particular player or for a particular group is generated, each user associated with the particular weave video or each user associated with a group associated with the particular weave video will see the associated weave video, for example, through a sharing mechanism where the shared weave video appears in the relevant user's inbox.

Figure 2B:
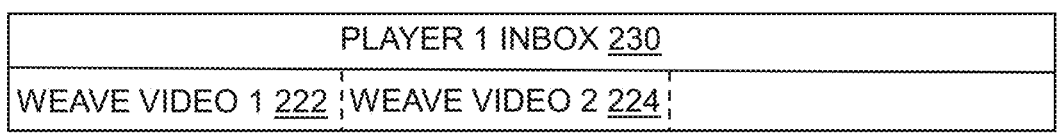
FIG. 2B depicts each player's inbox where the associated weave videos can be viewed based on the associations between the players and the weave videos shown in FIG. 2A.
Figure 2B:
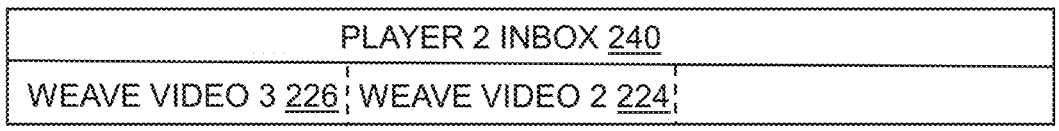
Figure 2B:
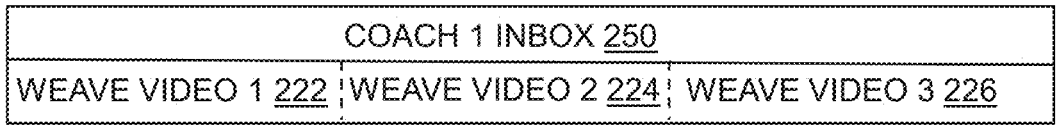

FIG. 2B depicts each player's inbox where the associated weave videos can be viewed based on the associations between the players and the weave videos shown in FIG. 2A. Referring to FIG. 2B, the Player 1 Inbox 230 includes Weave Video 1 222 and Weave Video 2 224. The Player 2 Inbox 240 includes Weave Video 3 226 and Weave Video 2 224. The Coach 1 Inbox 250 includes Weave Video 1 222, Weave Video 2 224, and Weave Video 3 226. Thus, each generated weave video is specific to the particular user or users viewing the weave video, which allows each user to see only the moments of the game (i.e., tile videos) that are relevant to that particular user. As can be seen from FIG. 2B, the order of the weave videos appearing in each player's inbox may be different for different viewing users. As explained above in the context of FIG. 2A, each weave video 210 may be made up of tile videos arranged in any order. A user's inbox may be stored remotely on a server such that the inbox can be accessed by a user from any client device. A copy of a user's inbox may be further stored locally on a client device, either temporarily or permanently. The weave video system may use network calls to keep the local copy of the inbox stored on the client device in sync with the remote copy of the inbox stored on the server.

Figure 3:
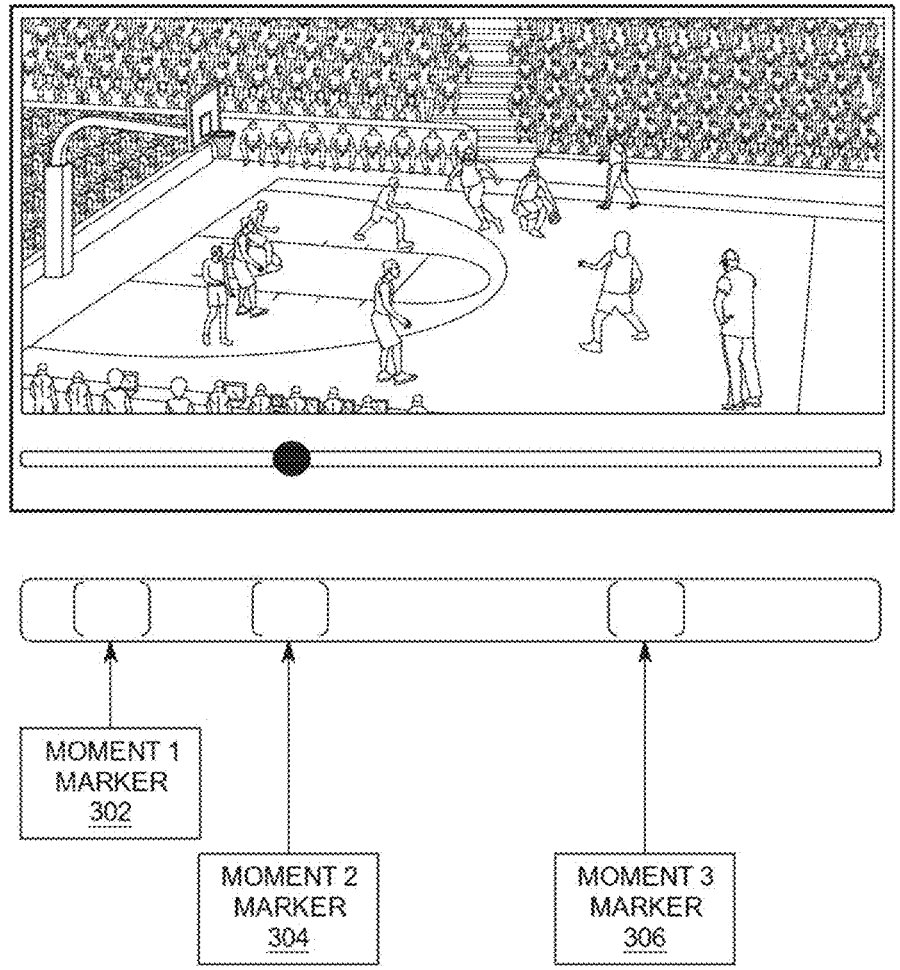
FIG. 3 depicts markers added to a video used for creating tile videos.

FIG. 3 depicts markers added to a video used for creating tile videos. Referring to FIG. 3, during video playback, a user may identify one or more moment markers that indicate a stillframe from the video, such as Moment 1 Marker 302, Moment 2 Marker 304, and Moment 3 Marker 306. Each moment marker indicates a timestamp of a stillframe in the video. As explained, each moment marker includes a pre-context and a post-context, as shown in the parentheses on the playback bar shown in FIG. 3. If a moment marker occurs within the first 3 seconds of the video, then the pre-context will use the available seconds preceding the moment marker; similarly, if a moment marker occurs within the last 3 seconds of the video, then the post-context will use the available seconds after the moment marker. It will be understood that other methods of identifying a moment may be used by the back-end server, such as, for example, pointers, timestamps, storing a new copy of the tile video (e.g., where storage space is not a major concern), or the like.

Figure 4A:
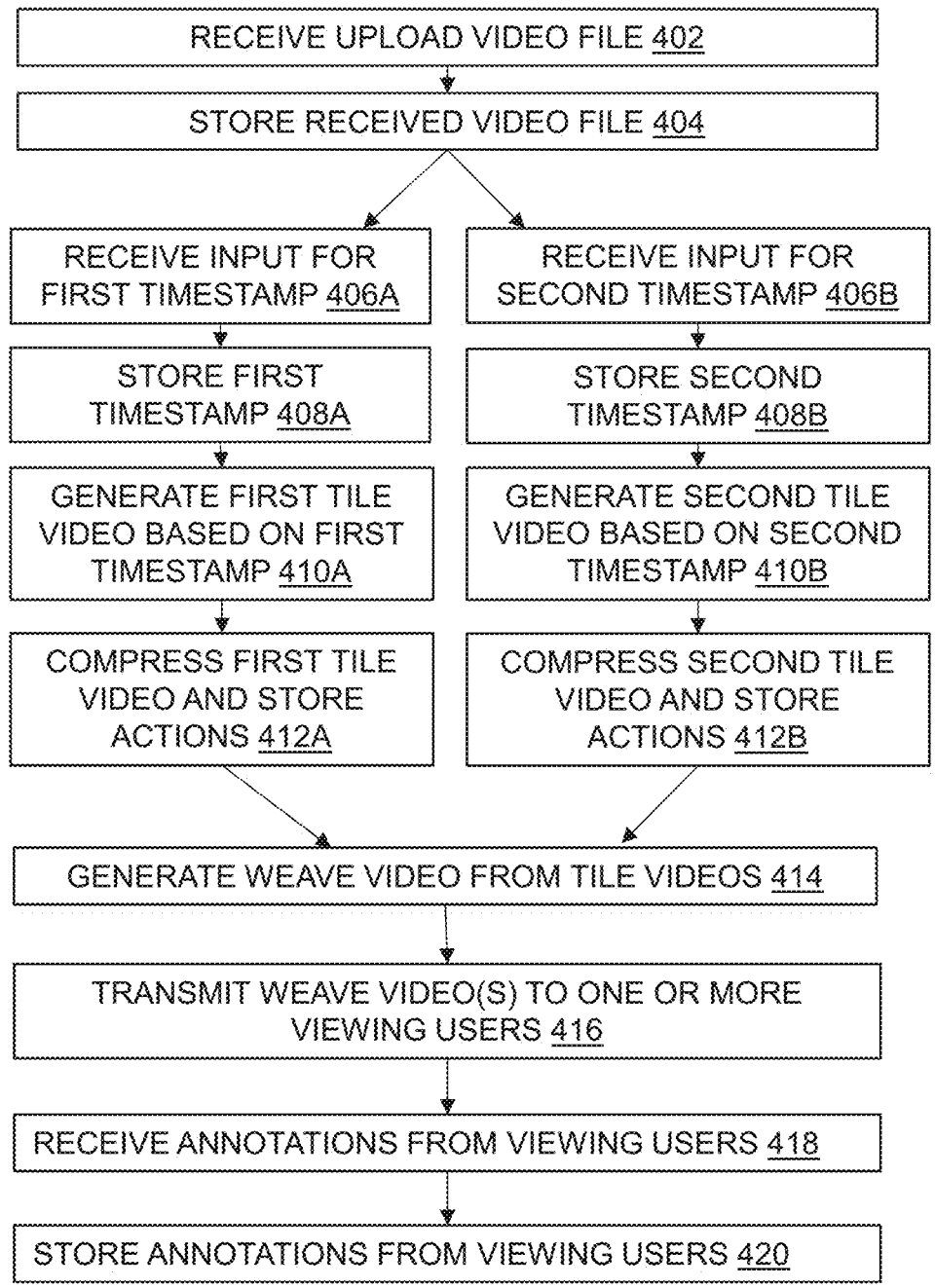
FIG. 4A depicts an exemplary process flow of the methods of segmenting and annotating a video for analysis performed by a back-end server of the system.

FIG. 4A depicts an exemplary process flow of the methods of segmenting and annotating a video for analysis performed by a back-end server of the system. Referring to FIG. 4A, the back-end server receives an upload comprising a video file of a sporting event, at step 402. The uploaded video may be any type of video. It may be a video captured on a user's mobile device, or it may be an existing online video or an existing video resident on a user's device received through a third-party video server. At step 404, the received video file is stored. The received video file may be stored, for example, in a database associated with the back-end server, or it may be stored in a local memory of the back-end server. In some embodiments, the back-end server may compress the uploaded video file before storing the video file in the database.

The back-end server receives input from a generating user to create one or more tile videos. Multiple inputs may be received to generate multiple tile videos. FIG. 4A shows input being received for two separate moments and thus two separate tile videos being created; however, any number of inputs and tile videos may be received and created, respectively. The following steps 406A-412A are referred to in the context of a first tile video; however, steps 406B-412B are the same steps for a second tile video, and so on.

At step 406A, the back-end server receives input from a generating user. The input from the generating user includes a first timestamp indicating a first moment in the video file. The input from the generating user may be provided via a graphical user-interface (GUI) of an application running on the client's device. The first moment of the video file is represented by a stillframe of the video file. At step 408A, the back-end server stores the first timestamp. The first timestamp is stored in association with the video file. The first timestamp may be stored in the database or in local memory. At step 410A, the back-end server generates a first tile video in response to the received input from the generating user. The first tile video comprises a pre-context of a pre-determined number of seconds of the video file immediately prior to the first moment indicated by the first timestamp. The first tile video further comprises a post-context of a pre-determined number of seconds of the video file immediately subsequent to the first moment indicated by the first timestamp. The first tile video further comprises the first moment indicated by the first timestamp.

At step 412A, the back-end server compresses the first tile video and stores any associated actions with the first tile video. The actions associated with the first tile video may include annotations, comments, and/or tags from the generating user. When the generating user creates the tile video, the user may perform actions on the tile video, such as adding annotations, comments, and/or tags to be displayed with the tile video. Any such actions are stored with the first tile video so that they will be viewable by the viewing user when they are replayed.

At step 414, the back-end server generates a weave video from the tile videos generated in steps 406A-412A, as well as other tile videos generated in steps 406B-412B. The weave video is an ordered video made up of the tile videos. The order of the tile videos may be set or determined by the user generating the weave video. The weave video is generated by merging the first tile video and the second tile video into an ordered weave video. As explained, there may be any number of tile videos that are merged into the ordered weave video. The order of the tile videos is specified by the generating user. The merging of the tile videos into the weave video may be accomplished by generating a new copy of a video comprising the tile videos, or it may be accomplished using pointers and/or markers so that the weave video may be compiled on the fly on an as-needed basis as a user accesses it from the client device.

At 416, the back-end server transmits the weave video to one or more of a plurality of viewing users. As explained in the context of FIG. 2A and FIG. 2B, each weave video is associated with a particular viewing user or viewing group, such that each user or group's weave videos may contain different tile videos. The weave videos for each user are stored in the user's inbox, such that they can be accessed from the server by the user's client device.

At step 418, the back-end server receives one or more annotations from a viewing user. The annotations may be provided via a GUI of an application running on the user's client device. The annotations are associated with one or more tile videos of the ordered weave video. The annotations may include a drawing overlaid on the tile video (e.g., shapes, arrows, circles, hand-drawn text, etc.), a comment associated with the tile video, or a tag associated with the tile video (e.g., a tag that can be used for searching or grouping the videos into categories).

At step 420, the back-end server stores the annotations in association with the weave videos. The annotations may be stored at the weave video level or at the tile video level, depending on the specific implementation. The annotations are associated with the tile videos and/or weave videos such that they will be displayed in association with the tile videos when the weave video is played by a viewing user. Thus, each tile vide within a weave video may include one or more associated annotations that are displayed when a viewing user views the weave video. The annotations can be added by the generating user or any viewing user (e.g., via the GUI), and annotations from multiple users for a particular tile video are displayed together in a compiled manner during playback of that particular tile video. For example, the annotations may be drawings or tags added directly to the stillframe indicated by the moment of the tile video or the pre-context or post-context surrounding the moment. In this way, a viewing user can draw on the video to highlight a particular movement or player position, or the like, for other viewing users to see when they view the tile video. Additionally, the annotations may be comments displayed in a threaded fashion below the playback of the tile video, such that a conversation among team members about the particular moment may be generated and displayed. Thus, in some embodiments, each tile video may be associated with a threaded conversation related to that tile video, and each threaded conversation is stored in the database. The annotations may be tags, which allow users of the system to search weave videos and/or tile videos by associated tags.

Figure 4B:
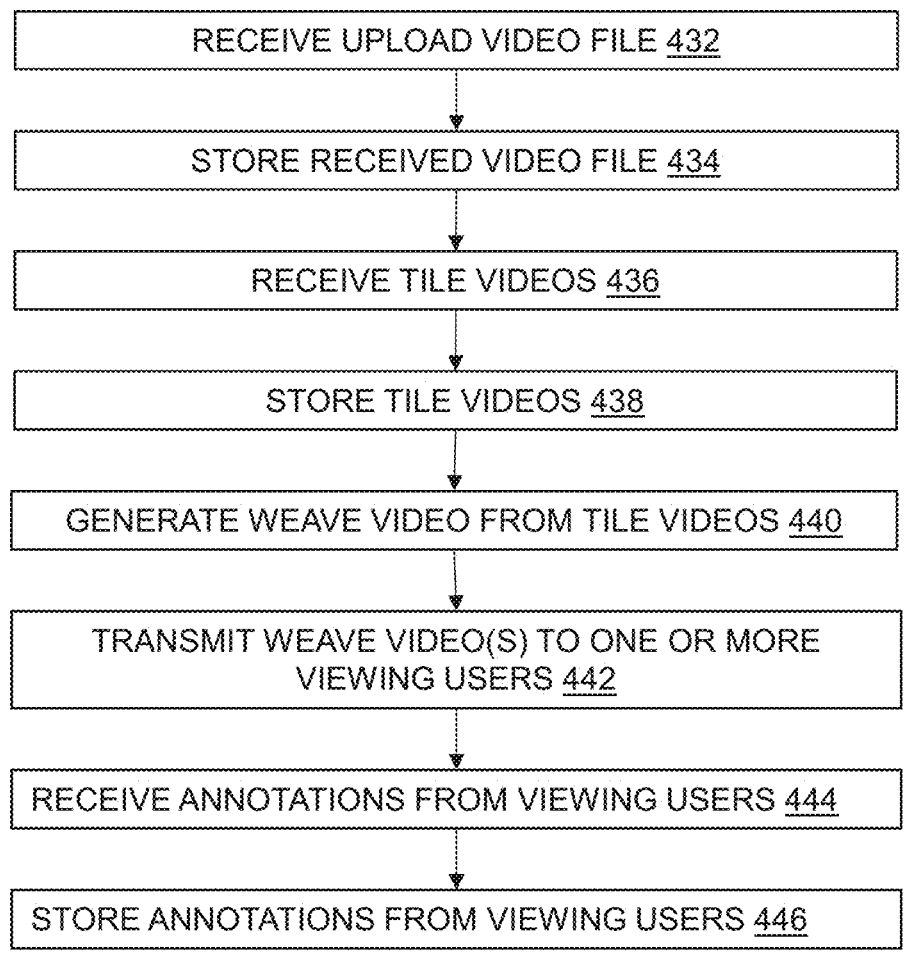
FIG. 4B depicts an exemplary process flow of the methods of segmenting and annotating a video for analysis performed by a back-end server of the system.

FIG. 4B depicts an exemplary process flow of the methods of segmenting and annotating a video for analysis performed by a back-end server of the system. Referring to FIG. 4B, the back-end server receives an upload comprising a video file of a sporting event, at step 432. The uploaded video may be any type of video. It may be a video captured on a user's mobile device, or it may be an existing online video or an existing video resident on a user's device received through a third-party video server. At step 434, the received video file is stored. The received video file may be stored, for example, in a database associated with the back-end server, or it may be stored in a local memory of the back-end server. In some embodiments, the back-end server may compress the uploaded video file before storing the video file in the database.

At step 436, the back-end server receives one or more tile videos from a generating user. The one or more tile videos are created on the user's computing device and sent to the back-end server. The one or more tile videos may already be compressed when they are received (i.e., compressed by the user's computing device), or they may be uncompressed when they are received, and the back-end server may compress them before storing them. The one or more tile videos received from the user may already include a first timestamp indicating a first moment in the video file. The first moment of the video file is represented by a stillframe of the video file. Each of the one or more tile videos comprises a pre-context of a pre-determined number of seconds of the video file immediately prior to the first moment indicated by the first timestamp. The tile videos further comprise a post-context of a pre-determined number of seconds of the video file immediately subsequent to the moment indicated by the timestamp. The tile video further comprises the moment indicated by the timestamp. Each of the tile videos may include actions with the tile video. The actions associated with the tile video may include annotations, comments, and/or tags from the generating user. When the generating user creates the tile video, the user may perform actions on the tile video, such as adding annotations, comments, and/or tags to be displayed with the tile video. Any number of tile videos may be received.

At step 438, the back-end server stores the tile videos. In some embodiments, the timestamp for each tile video is stored in association with the respective tile video. Each timestamp may be stored in the database or in local memory. In some embodiments, the actions associated with each tile video are stored in association with the respective tile video. The actions may be stored in the database or in local memory.

At step 440, the back-end server generates a weave video from the received tile videos. The weave video is an ordered video made up of the tile videos. The order of the tile videos may be set or determined by the user generating the weave video. The weave video is generated by merging the first tile video and the second tile video into an ordered weave video. As explained, there may be any number of tile videos that are merged into the ordered weave video. The order of the tile videos is specified by the generating user. The merging of the tile videos into the weave video may be accomplished by generating a new copy of a video comprising the tile videos, or it may be accomplished using pointers and/or markers so that the weave video may be compiled on the fly on an as-needed basis as a user accesses it from the client device.

At 442, the back-end server transmits the weave video to one or more of a plurality of viewing users. As explained in the context of FIG. 2A and FIG. 2B, each weave video is associated with a particular viewing user or viewing group, such that each user or group's weave videos may contain different tile videos. The weave videos for each user are stored in the user's inbox, such that they can be accessed from the server by the user's client device.

At step 444, the back-end server receives one or more annotations from a viewing user. The annotations may be provided via a GUI of an application running on the user's client device. The annotations are associated with one or more tile videos of the ordered weave video. The annotations may include a drawing overlaid on the tile video (e.g., shapes, arrows, circles, hand-drawn text, etc.), a comment associated with the tile video, or a tag associated with the tile video (e.g., a tag that can be used for searching or grouping the videos into categories).

At step 446, the back-end server stores the annotations in association with the weave videos. The annotations may be stored at the weave video level or at the tile video level, depending on the specific implementation. The annotations are associated with the tile videos and/or weave videos such that they will be displayed in association with the tile videos when the weave video is played by a viewing user. Thus, each tile vide within a weave video may include one or more associated annotations that are displayed when a viewing user views the weave video. The annotations can be added by the generating user or any viewing user (e.g., via the GUI), and annotations from multiple users for a particular tile video are displayed together in a compiled manner during playback of that particular tile video. For example, the annotations may be drawings or tags added directly to the stillframe indicated by the moment of the tile video or the pre-context or post-context surrounding the moment. In this way, a viewing user can draw on the video to highlight a particular movement or player position, or the like, for other viewing users to see when they view the tile video. Additionally, the annotations may be comments displayed in a threaded fashion below the playback of the tile video, such that a conversation among team members about the particular moment may be generated and displayed. Thus, in some embodiments, each tile video may be associated with a threaded conversation related to that tile video, and each threaded conversation is stored in the database. The annotations may be tags, which allow users of the system to search weave videos and/or tile videos by associated tags.

In addition to the annotations and targeted sharing provided by the weave video system, the weave video system further allows for users to challenge one another. For example, a coach may issue a challenge to each player to identify a particular moment where the responding player thinks they did a good job, a bad job, or the like. The challenges may be completed by the players on their mobile apps and the resulting tile videos can be sent to the coach (or challenging player) in real-time. Such a system creates accountability, which allows for better performance analysis.

Figure 4C:
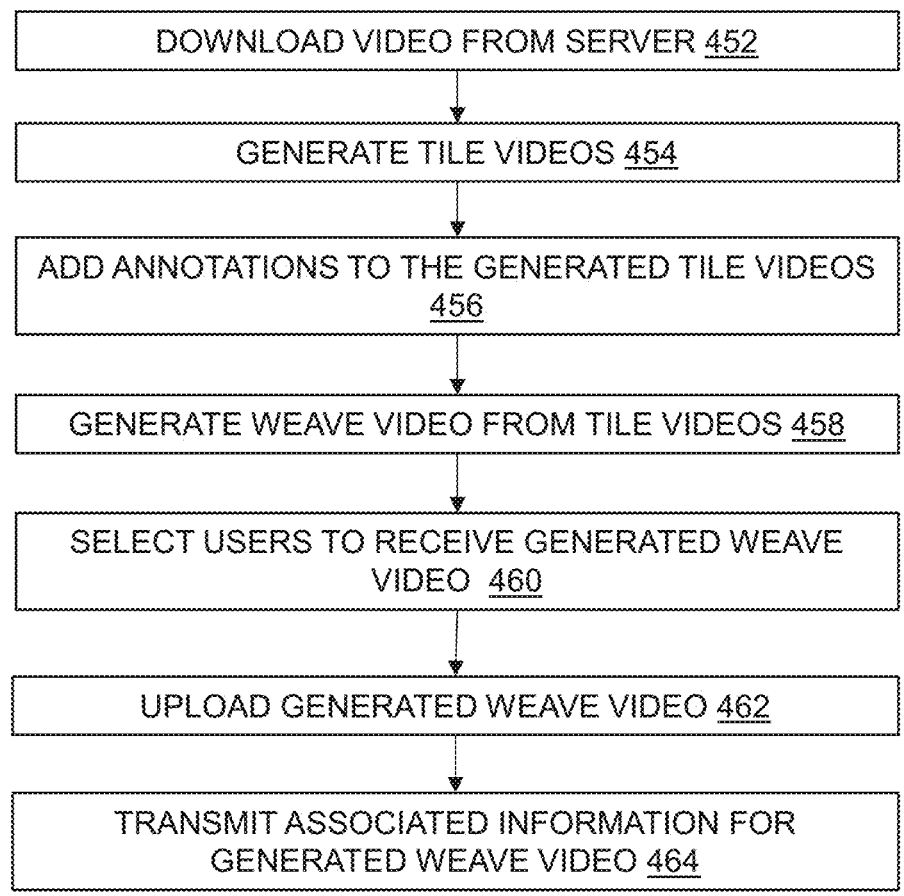
FIG. 4C depicts an exemplary process flow of the methods of segmenting and annotating videos for analysis performed by a client device.

FIG. 4C depicts an exemplary process flow of the methods of segmenting and annotating videos for analysis performed by a client device.

Referring to FIG. 4C, the client device downloads a video from a server at step 452. The video may be selected by a user at the client device (e.g., via the GUI). The video may be downloaded from the back-end server of the weave video system, or it may be downloaded from a third-party video hosting server. In some embodiments, the video may be taken directly on the client device, using the native camera application or using a camera functionality within the mobile application of the weave video system.

At step 454, the client device generates one or more tile videos. The tile videos are generated based on user input from the user of the client device. As explained above, a user of the client device selects one or more moments from the video, and a tile video is generated for each of the moments selected by the user. The tile video includes a pre-context and a post-context for the moment represented by the tile video.

At step 456, the client device adds annotations to the generated tile videos. The annotations are input into the client device by the user of the client device, and those annotations are associated with and/or added to the tile videos by the client device. As explained above, the annotations may include drawings, comments, and/or tags associated with the tile videos. The client device stores any editing operations the user has performed on the tile videos, such as annotations, comments, and/or tags.

At step 458, the client device generates one or more weave videos from the tile videos. The weave videos are generated from the various tile videos created by the user. In some embodiments, the order of the tile videos within the weave video is specified by the user during creation.

At step 460, the client device selects users to receive the generated weave video. The user of the client device may designate other users with whom the generated weave video will be shared. The weave video may be shared either publicly or privately, as chosen by the user.

At step 462, the client device uploads the generated weave video to the back-end server.

At step 464, the client device transmits associated information for the generated weave video to the back-end server. Such associated information may include the annotations, comments, and/or tags, as well as the identity of the generating user, the time the weave video was generated, how long the weave video may remain accessible, and the like.

The back-end server configured to implement the methods of FIG. 4A, FIG. 4B, and/or FIG. 4C may be a physical server or a virtual server. In other embodiments, the back-end server may be located on a company premise, or located in any other type of datacenter. The back-end server may also be configured as a plurality of physical servers and/or virtual servers. In some embodiments, an Ubuntu® server may provide the virtual server and may be implemented as a separated operating system (OS) running on one or more physical (i.e., hardware implemented) servers. Any applicable virtual server may by be used for the Ubuntu® Server function. The Ubuntu® server or other server may be implemented within the Microsoft Azure®, Amazon Web Services (AWS®), IBM cloud computing, environment, or the like.

The client device may configured to implement the methods of FIG. 4A, FIG. 4B, and/or FIG. 4C may be a fixed device or a mobile device. For example, a fixed device may be a workstation, a personal computer (PC), a smart television (TV), or the like. The mobile device may be any computing device capable of being transported easily from a one location to another location without undue difficulty and one that is capable of functional connection with a back-end server regardless of its location. For example, the mobile device may be a smart tablet, a laptop, or the like. In certain embodiments, the fixed device may be fixed within a mobile vehicle.

In general, the client device as used with the weave video system may be any computing device providing a user input, display, and connectivity to one or more servers over a personal area network (PAN), a local area network (LAN) and/or a wide area network (WAN). The PAN may include Bluetooth® or Universal Serial Bus (USB). The LAN may include any combination of wired Ethernet and/or Wi-Fi access points. The WAN may include the Internet and/or another wide area private network. The WAN may also include any combination of 2G, 3G, 4G, and 5G networks. In some embodiments the WAN may include Data Over Cable Service Interface Specification (DOCSIS) networks and/or fiber networks such as passive optical networks (PONs). Access to the one or more servers may also be provided via a virtual private network (VPN) within any of the previously described networks.

Figure 5A:
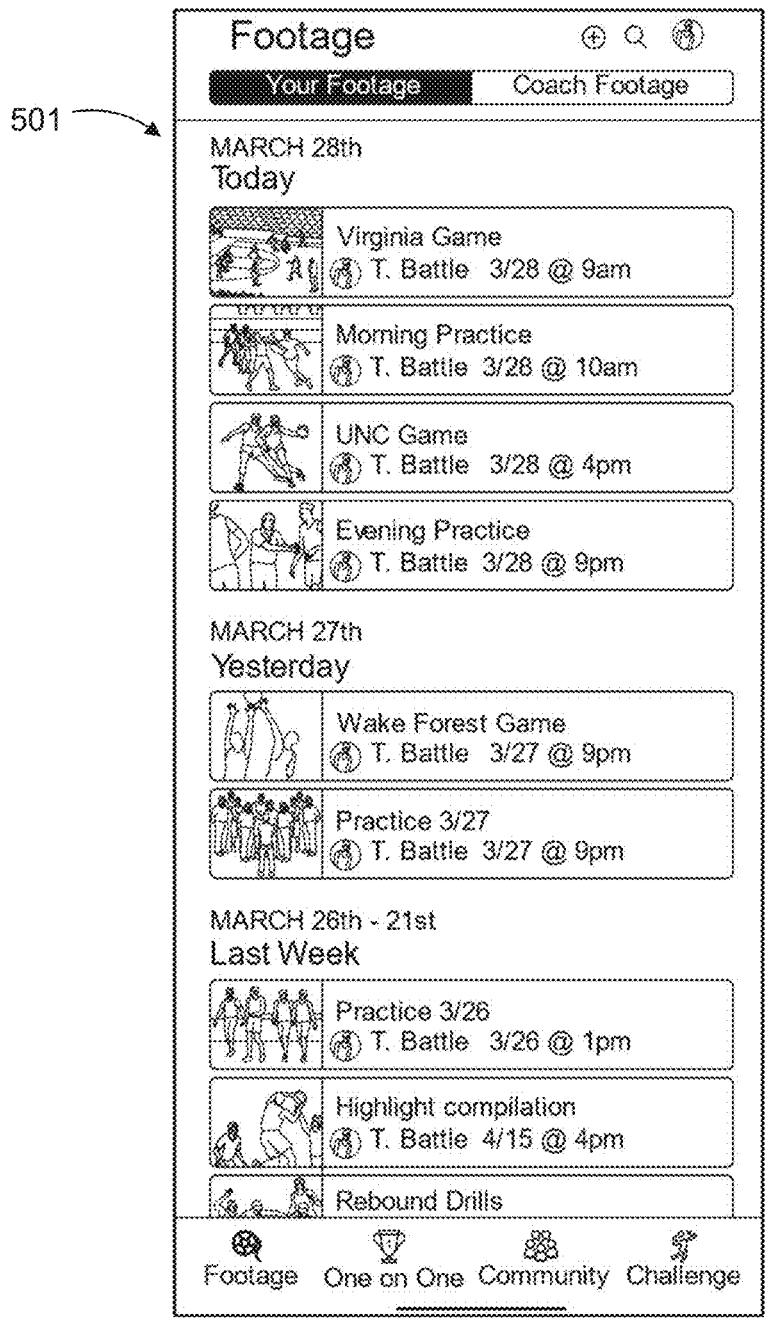
FIGS. 5A-5B depict screenshots of a graphical user interface running on a mobile application of the weave video system showing uploaded video footage that is available for editing.
Figure 5B:
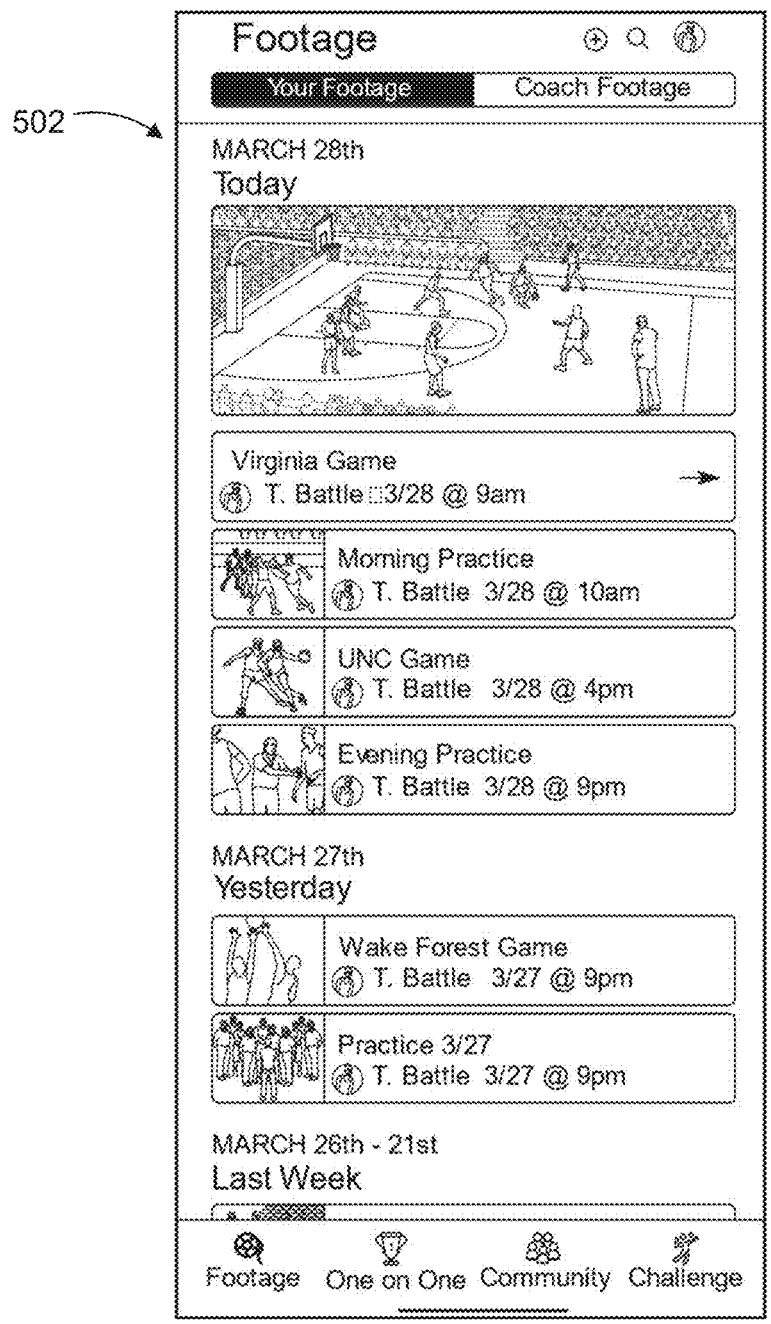
Figure 5C:
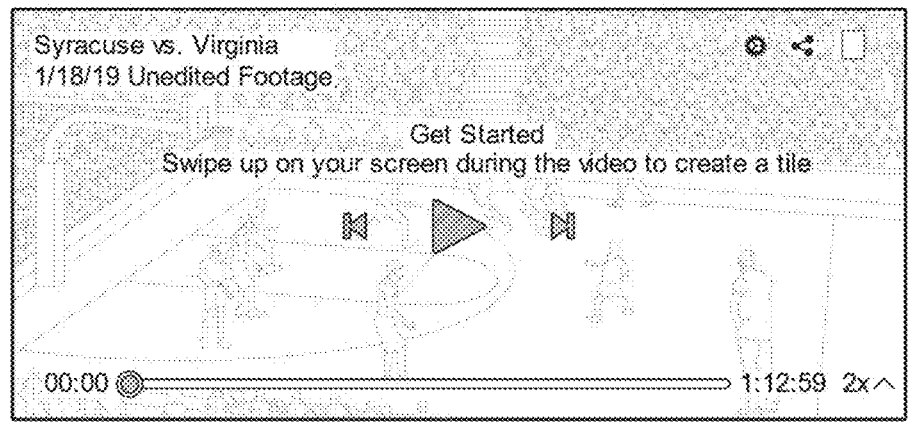
FIG. 5C depicts a screenshot of a graphical user interface running on a mobile application of the weave video system showing a video to be used to create a tile video for use in a weave video.
Figure 5D:
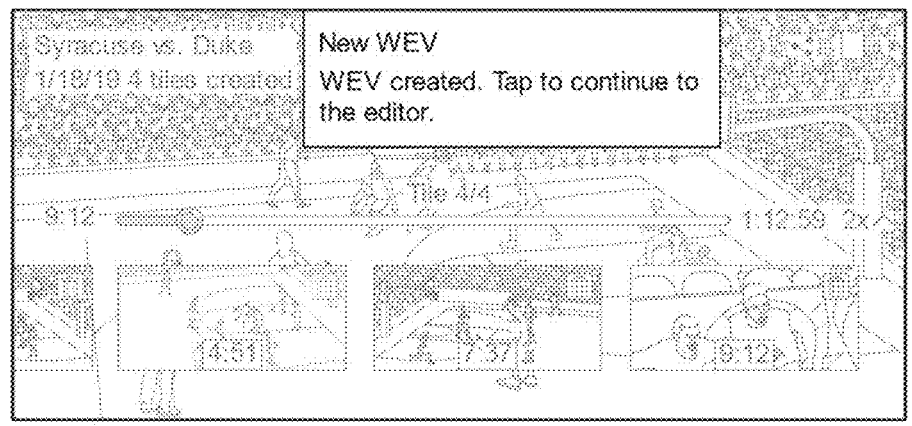
FIG. 5D depicts a screenshot of a graphical user interface running on a mobile application of the weave video system showing a collection of tile videos that have been created to generate a weave video.
Figure 5E:
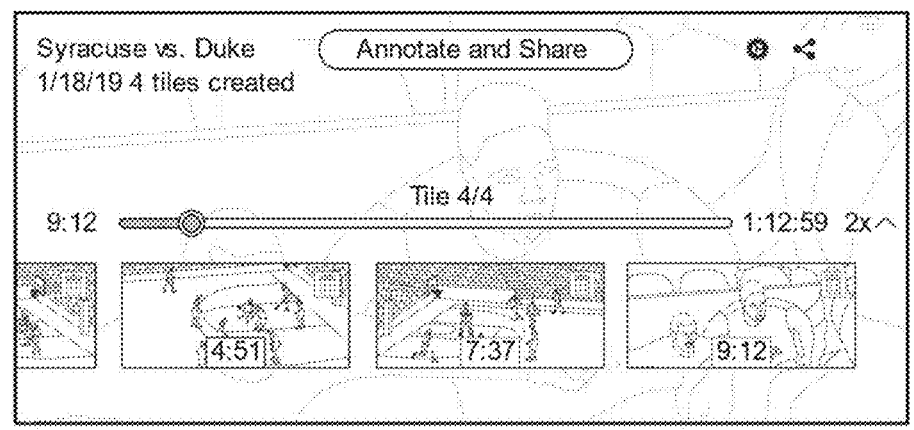
FIG. 5E depicts a screenshot of a graphical user interface running on a mobile application of the weave video system showing a selection of a tile video to add user annotations to the tile video for use in a weave video.
Figure 5F:
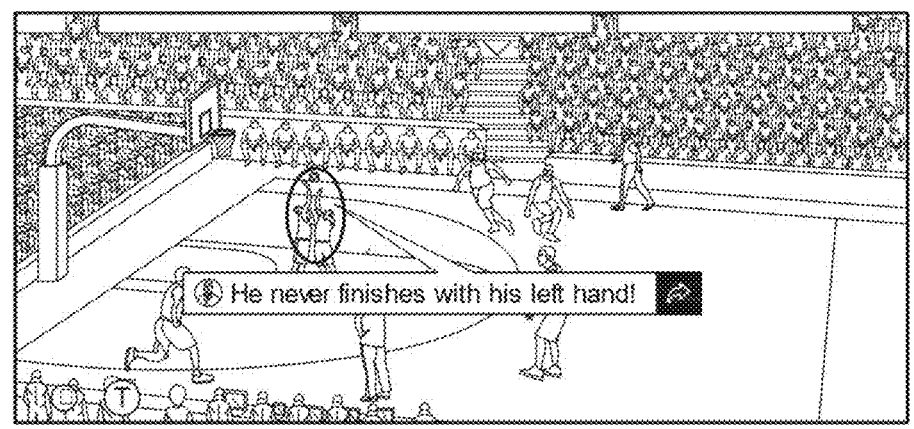
FIG. 5F depicts a screenshot of a graphical user interface running on a mobile application of the weave video system showing a user's addition of annotation and comments to a tile video for use in a weave video.
Figure 5G:
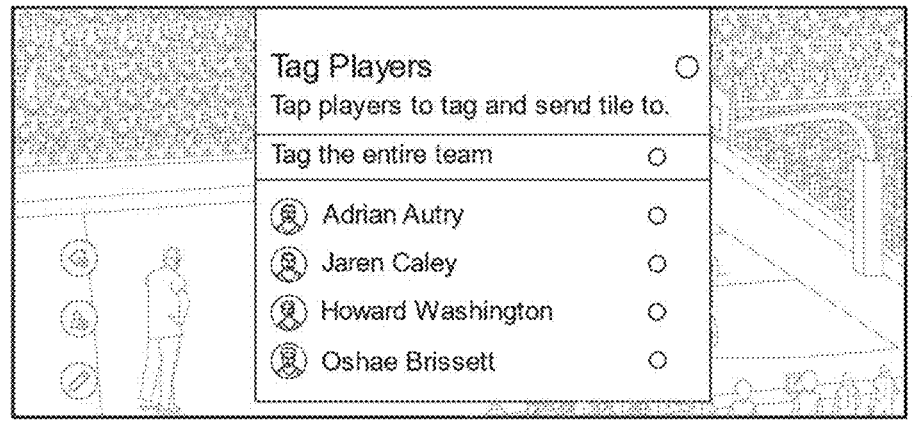
FIGS. 5G-5H depict screenshots of a graphical user interface running on a mobile application of the weave video system showing tagging players in a tile video and sharing the weave video with other users.
Figure 5H:
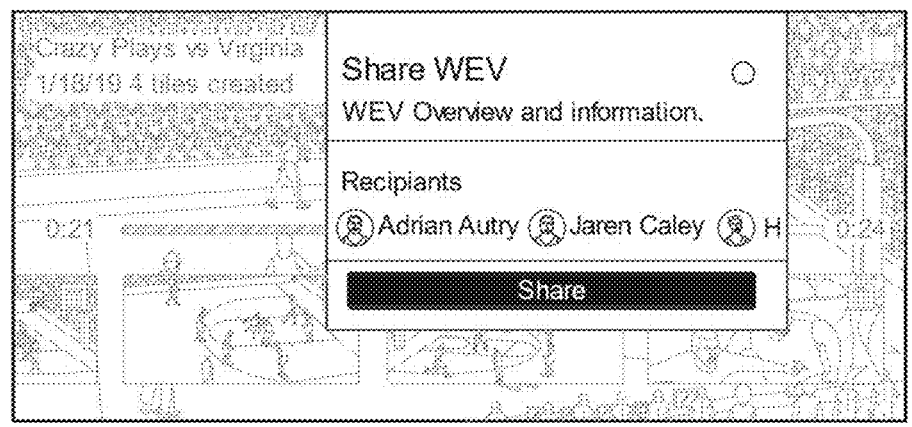
Figure 5I:
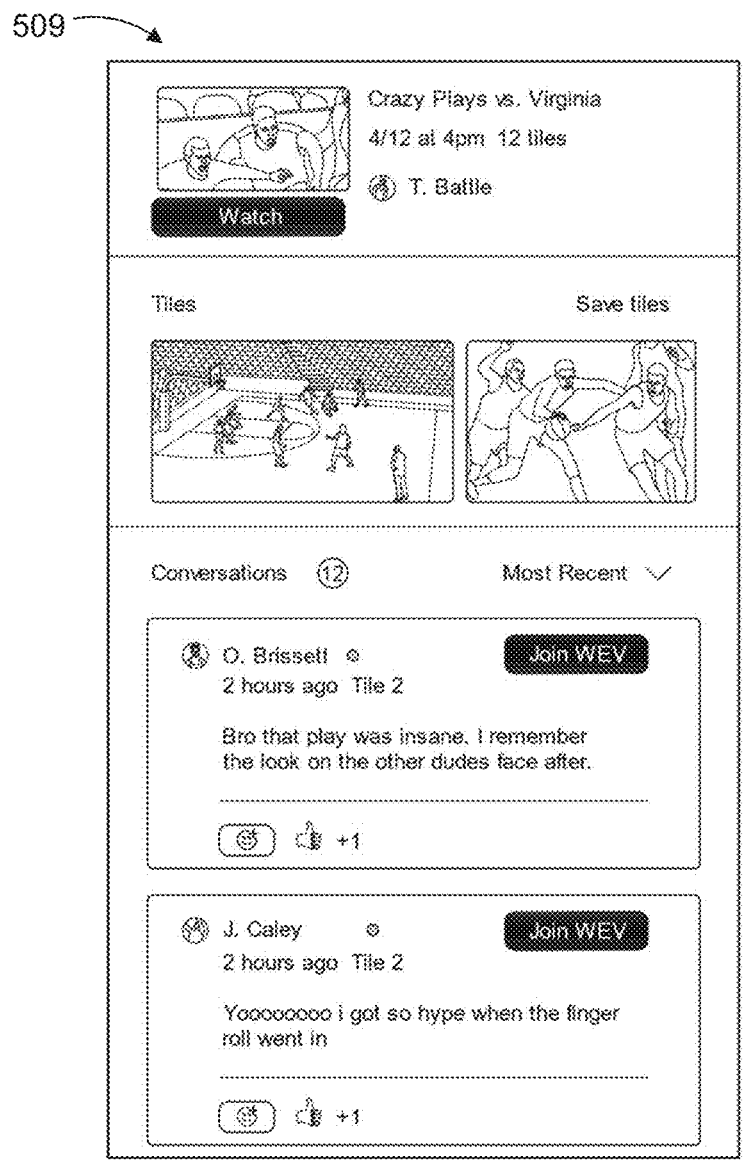
FIG. 5I depicts a screenshot of a graphical user interface running on a mobile application of the weave video system showing a weave video, the tile videos that make up the weave video, and threaded conversations associated with the weave video.
Figure 5J:
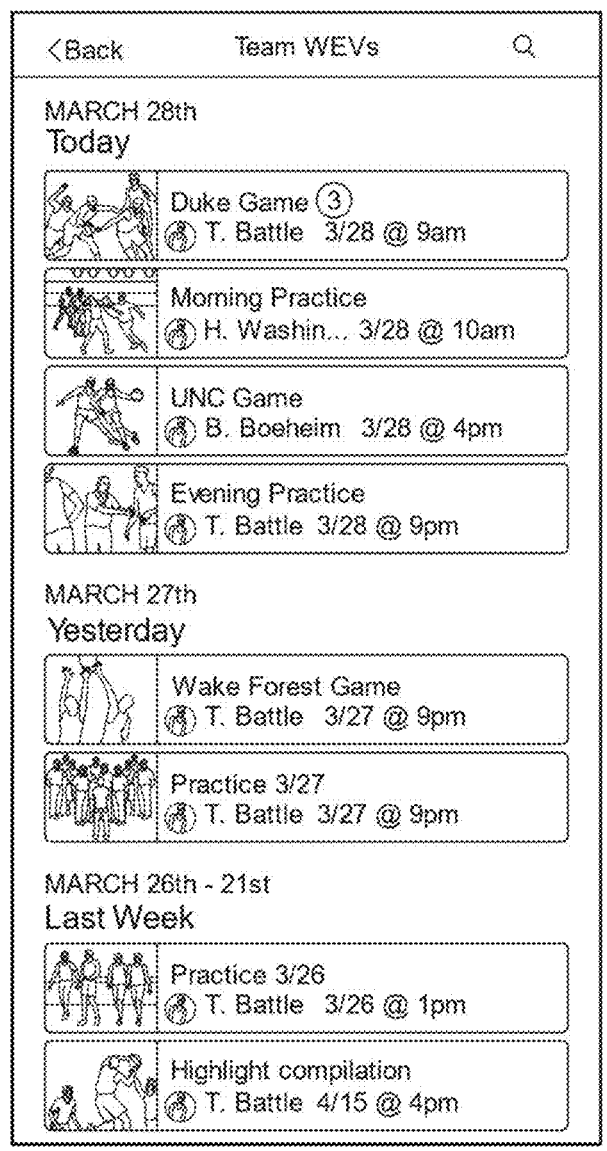
FIGS. 5J-5K depict screenshots of a graphical user interface running on a mobile application of the weave video system showing a player's inbox displaying weave videos that have been shared with the player.
Figure 5K:
Figure 5L:
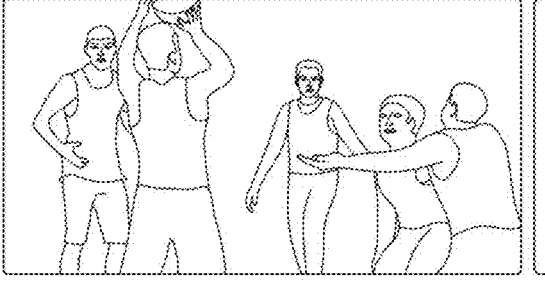
FIG. 5L depicts a screenshot of a graphical user interface running on a mobile application of the weave video system showing a weave video, the tile videos that make up the weave video, and threaded conversations associated with the weave video.
Figure 5M:
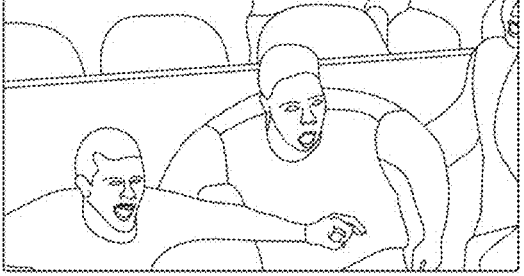
FIGS. 5M-5N depict screenshots of a graphical user interface running on a mobile application of the weave video system showing available weaves in the weave video system, which weave videos are trending, and the ability to search for weave videos.
Figure 5N:
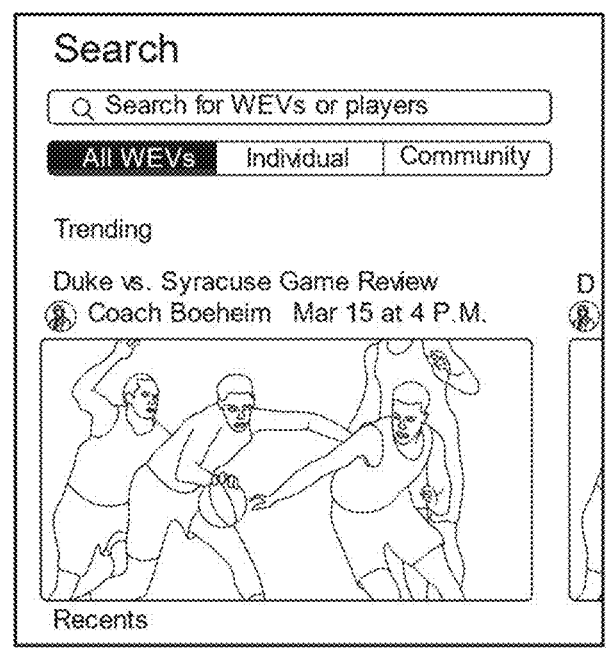
Figure 5O:
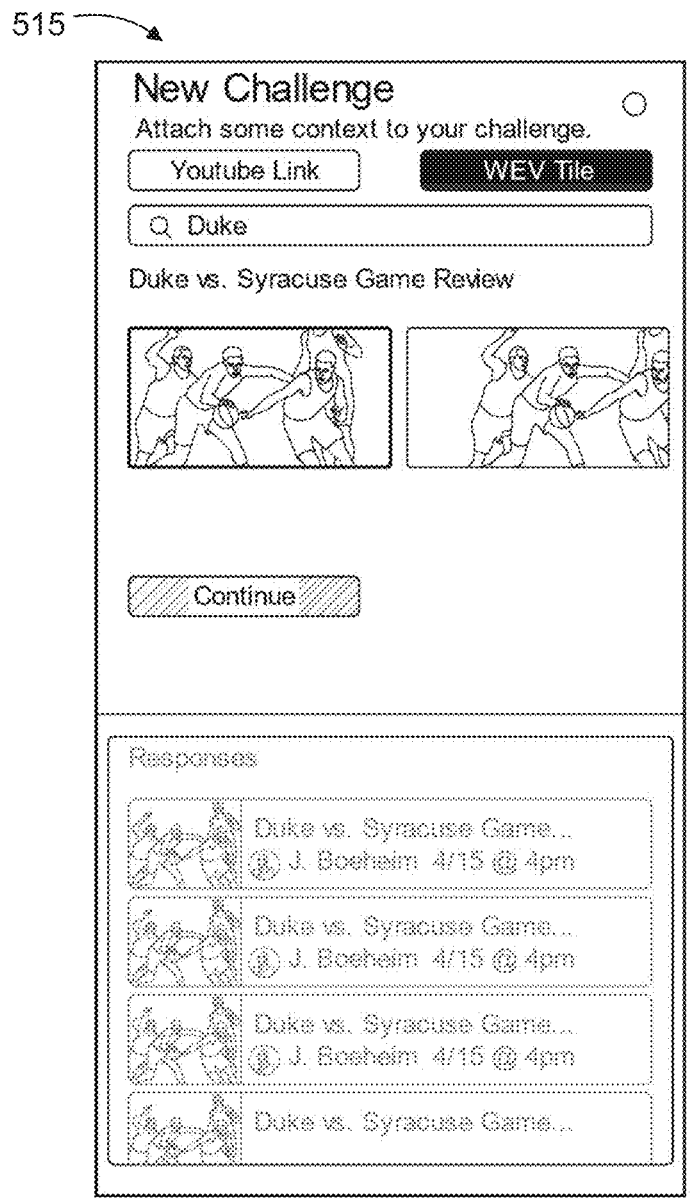
FIGS. 5O-5P depict screenshots of a graphical user interface running on a mobile application of the weave video system showing challenges that can be issued among users of the weave video system to drive engagement.
Figure 5P:
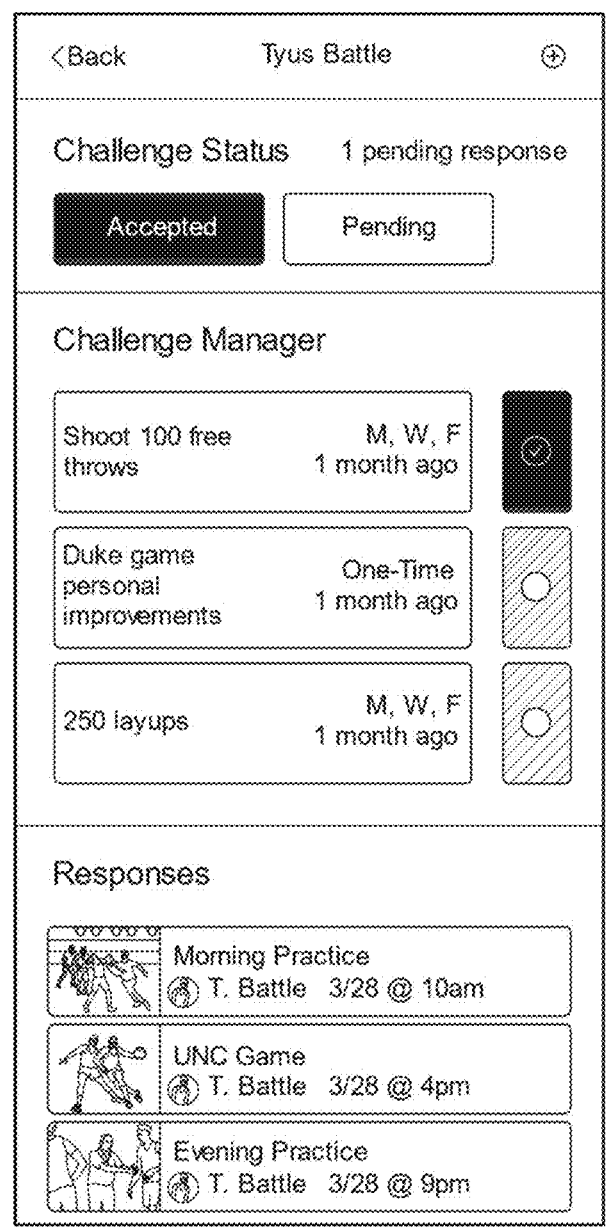
Figure 6:
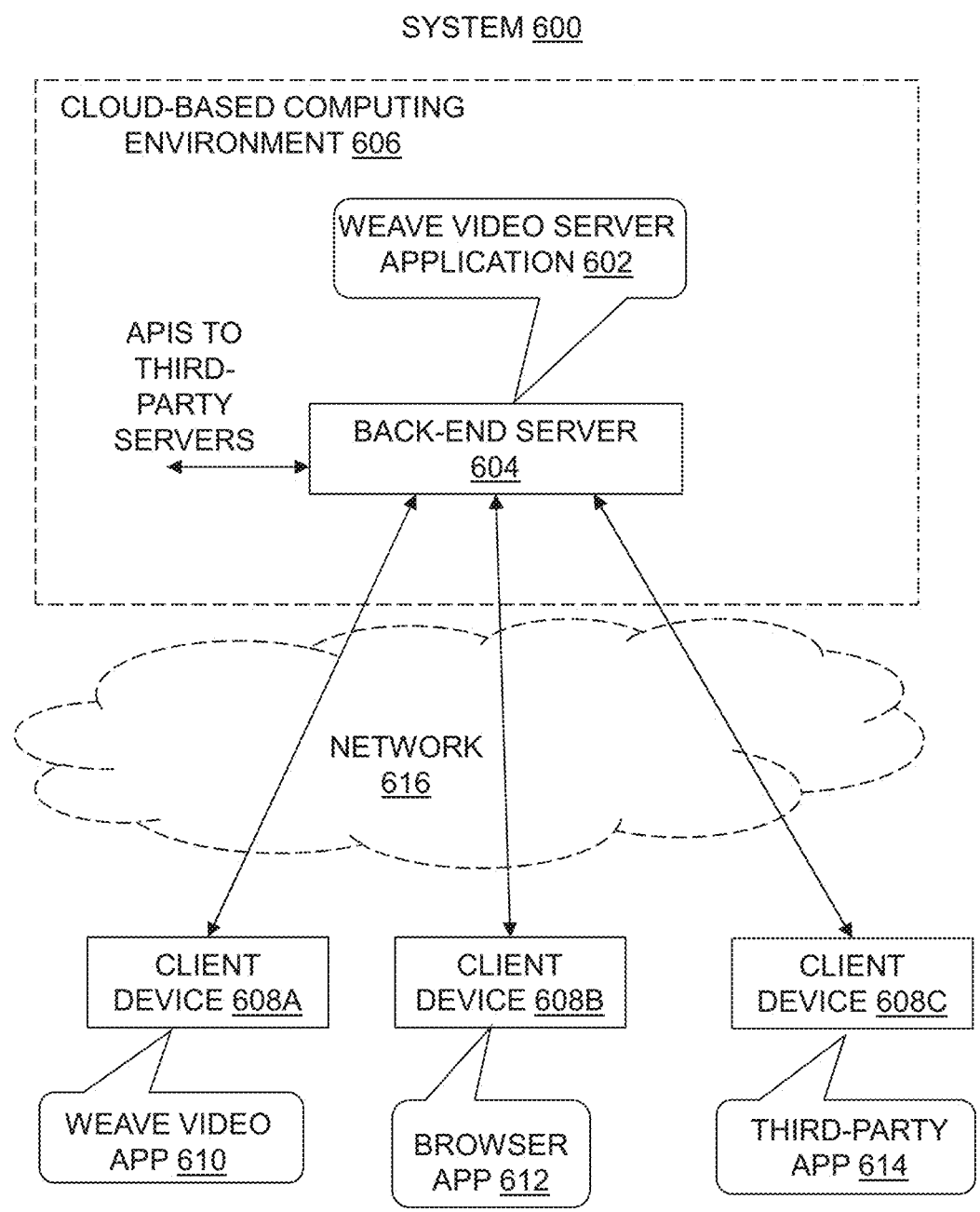
FIG. 6 depicts a system 600 implementing the weave video system as a client/server architecture.
Figure 9:
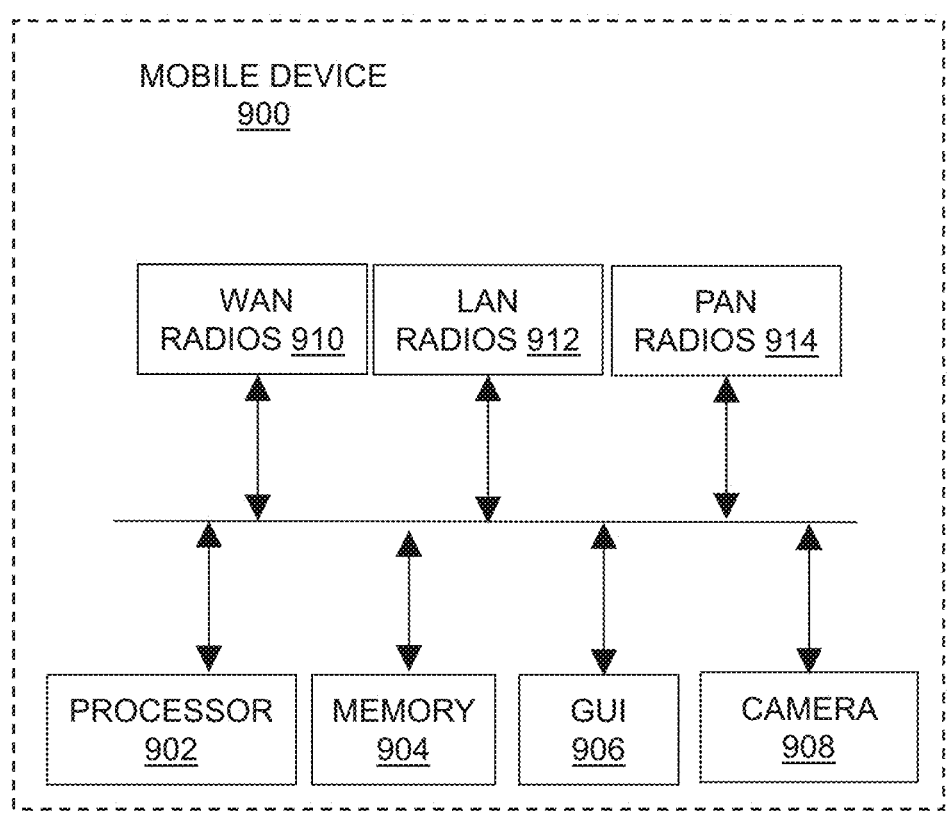
FIG. 9 depicts a block diagram illustrating one embodiment of a mobile device 900.

FIGS. 5A-5P below depict various screenshots of a mobile application 610 (as shown in FIG. 6) running on a computing device 608A (or 800) or mobile device 900 (as shown in FIG. 9) of the weave video system 600 described herein. The mobile application 610 running on computing device 608A (or 800) or mobile device 900 performs aspects of the methods described herein. The mobile application 610 of the weave video system 600 is in communication (e.g., over network 616) with the weave video server application 602 executing on back-end server 604 (as shown in FIG. 6), which is part of cloud-based computing environment 606 (as shown in FIG. 6).

FIG. 5A depicts a screenshot 501 of a mobile application of the weave video system showing uploaded videos that are available for editing.

FIG. 5B depicts a screenshot 502 of a mobile application of the weave video system showing a list of available weave videos for a particular user that have been shared with the user.

FIG. 5C depicts a screenshot 503 of a mobile application of the weave video system showing a weave video made up of tile videos with comments associated with a particular tile video.

FIG. 5D depicts a screenshot 504 of a mobile application of the weave video system showing user annotations and comments made to a tile video.

FIG. 5E depicts a screenshot 505 of a graphical user interface running on a mobile application of the weave video system showing a selection of a tile video to add user annotations to the tile video for use in a weave video.

FIG. 5F depicts a screenshot 506 of a graphical user interface running on a mobile application of the weave video system showing a user's addition of annotation and comments to a tile video for use in a weave video.

FIG. 5G depicts a screenshot 507 of a graphical user interface running on a mobile application of the weave video system showing tagging players in a tile video.

FIG. 5H depicts a screenshot 508 of a graphical user interface running on a mobile application of the weave video system showing sharing the weave video with other users.

FIG. 5I depicts a screenshot 509 of a graphical user interface running on a mobile application of the weave video system showing a weave video, the tile videos that make up the weave video, and threaded conversations associated with the weave video. For clarity, the threaded conversations for each tile video within the weave video may be separated out such that each threaded conversation applies and is shown at the tile video level.

FIG. 5J depicts a screenshot 510 of a graphical user interface running on a mobile application of the weave video system showing a player's inbox displaying weave videos that have been shared with the player. In the screenshot 510 shown in FIG. 5J, the inbox displays team weave videos, which have been shared with the entire team.

FIG. 5K depicts a screenshot 511 of a graphical user interface running on a mobile application of the weave video system showing a player's inbox displaying weave videos that have been shared with the player. In the screenshot 511 shown in FIG. 5K, the inbox displays one-on-one weave videos, which have been shared with the player directly.

FIG. 5L depicts a screenshot 512 of a graphical user interface running on a mobile application of the weave video system showing a weave video, the tile videos that make up the weave video, and threaded conversations associated with the weave video.

FIG. 5M depicts a screenshot 513 of a graphical user interface running on a mobile application of the weave video system showing available weaves in the weave video system, which weave videos are trending, and the ability to search for weave videos.

FIG. 5N depicts a screenshot 514 of a graphical user interface running on a mobile application of the weave video system showing available weaves in the weave video system, which weave videos are trending, and the ability to search for weave videos.

FIG. 5O depict a screenshot 515 of a graphical user interface running on a mobile application of the weave video system showing challenges that can be issued among users of the weave video system to drive engagement.

FIG. 5P depicts a screenshot of a graphical user interface running on a mobile application of the weave video system showing challenges that can be issued among users of the weave video system to drive engagement.

FIG. 6 depicts a system 600 implementing the weave video system as a client/server architecture. The system 600 includes a weave video server application 602 hosted on a back-end server 604. The back-end server 604 may be resident in a cloud-based computing environment 606, for example, Amazon® AWS. The back-end server 604 may communicate with a plurality of client devices 608A-C. The client devices 608A-C and their users may access the weave video server application 602 using a weave video app 610, a browser app 612, or a third-party app 614. The client devices 608A-C may be smart tablets, laptops, workstations, PCs, smart TVs, or the like. The client devices 608A-C may communicate with the weave video server application 602 over a network 616. The network 616 may be any type or combination of wired, wireless, and/or optical networks. The network 616 may include one or more of the previously described networks.

The back-end server 604 running the weave video server application 602 may perform any of the methods described in the summary, detailed description, figures, and/or claims. The weave video server application 602 may also interface to one or more third-party servers via an application programming interface (API). The third-party servers may include, for example, third-party video storage servers, such as YouTube®, or third-party game-tape analysis programs.

The weave video server application 602 transforms the back-end server 604 from a generic computer function into a machine for solving the problem of quickly segmenting a game tape for analysis by multiple players and/or coaching staff.

Figure 7:
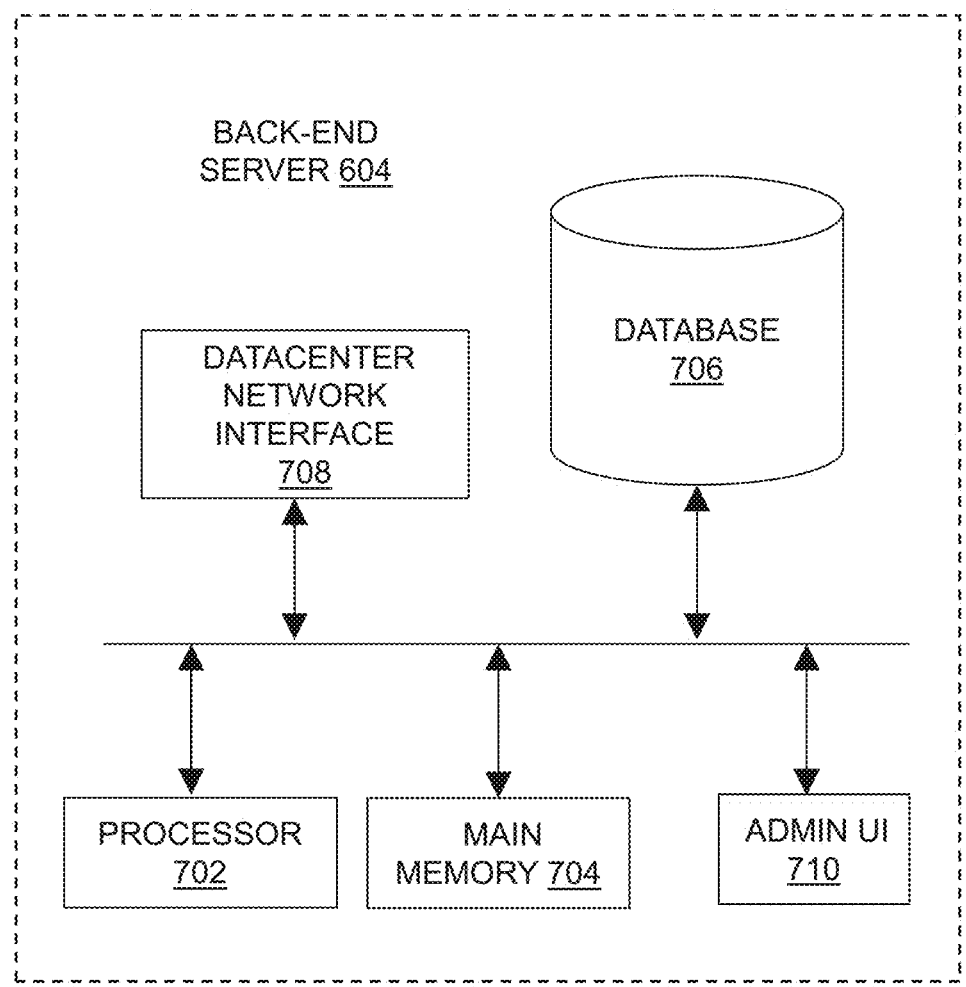
FIG. 7 illustrates an example block diagram of one embodiment of the back-end server 604 of FIG. 6.

FIG. 7 illustrates an example block diagram of one embodiment of the back-end server 604 of FIG. 6. The back-end server 604 may include at least one of processor 702, a main memory 704, a database 706, a datacenter network interface 708, and an administration user interface (UI) 710. The back-end server 604 may be configured to host the Ubuntu® server as discussed earlier. In some embodiments Ubuntu® server may be distributed over a plurality of hardware servers using hypervisor technology.

The processor 702 may be a multi-core server class processor suitable for hardware virtualization. The processor may support at least a 64-bit architecture and a single instruction multiple data (SIMD) instruction set. The main memory 704 may include a combination of volatile memory (e.g. random-access memory) and non-volatile memory (e.g. flash memory). The database 706 may include one or more hard drives.

The datacenter network interface 708 may provide one or more high-speed communication ports to the data center switches, routers, and/or network storage appliances. The datacenter network interface 708 may include high-speed optical Ethernet, InfiniBand (IB), Internet Small Computer System Interface (iSCSI), and/or Fibre Channel interfaces. The administration UI may support local and/or remote configuration of the back-end server 604 by a datacenter administrator.

Figure 8:
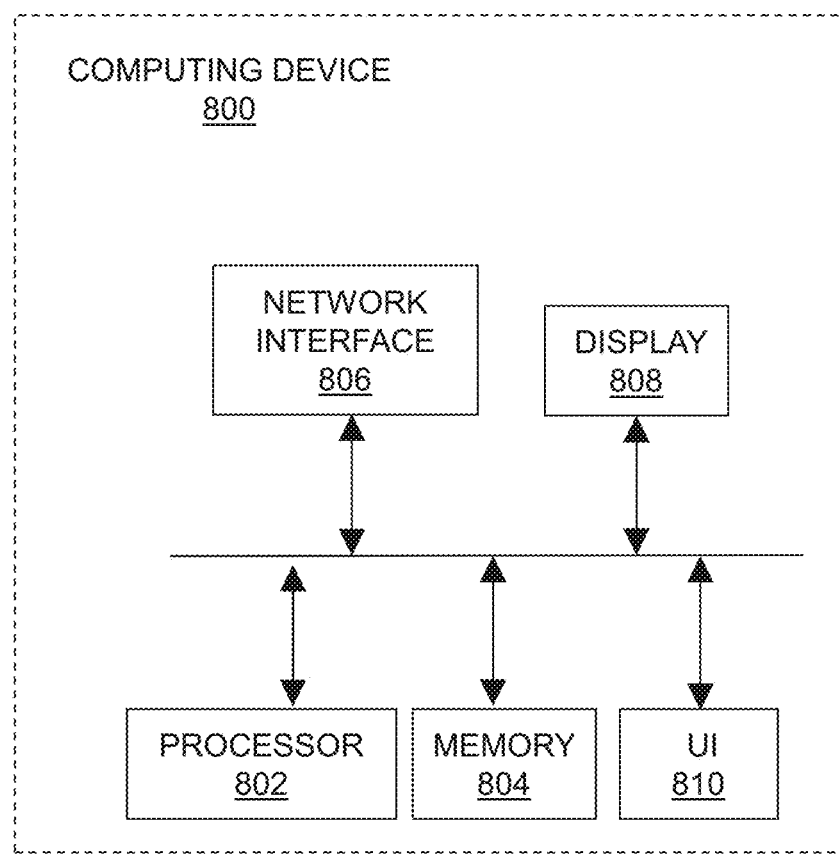
FIG. 8 depicts a block diagram illustrating one embodiment of a computing device 800.

FIG. 8 depicts a block diagram illustrating one embodiment of a computing device 800. The workstation may be any of the client devices 608A-C of FIG. 6. The computing device 800 may include at least one processor 802, a memory 804, a network interface 806, a display 808, and a UI 810. The memory 804 may be partially integrated with the processor 802. The UI 810 may include a keyboard and a mouse. The display 808 and the UI 810 may provide any of the GUIs in the embodiments of this disclosure.

FIG. 9 depicts a block diagram illustrating one embodiment of a mobile device 900. The mobile device 900 may be any of the client devices 608A-C of FIG. 6. The mobile device 900 may be a smart tablet. The mobile device 900 may include at least a processor 902, a memory 904, a GUI 906, a camera 908, WAN radios 910, LAN radios 912, and PAN radios 914. In some embodiments, the mobile device 900 may be a laptop, a tablet, or the like.

In some embodiments, the processor 902 may be a mobile processor such as the Qualcomm® Snapdragon™ mobile processor. The memory 904 may include a combination of volatile memory (e.g. random-access memory) and non-volatile memory (e.g. flash memory). The memory 904 may be partially integrated with the processor 902. The GUI 906 may be a touchpad display. The WAN radios 910 may include 2G, 3G, 4G, and/or 5G technologies. The LAN radios 912 may include Wi-Fi technologies such as 802.11a, 802.11b/g/n, 802.11ac, 802.11.ax or the like circuitry. The PAN radios 914 may include Bluetooth® technologies.

Figure 10:
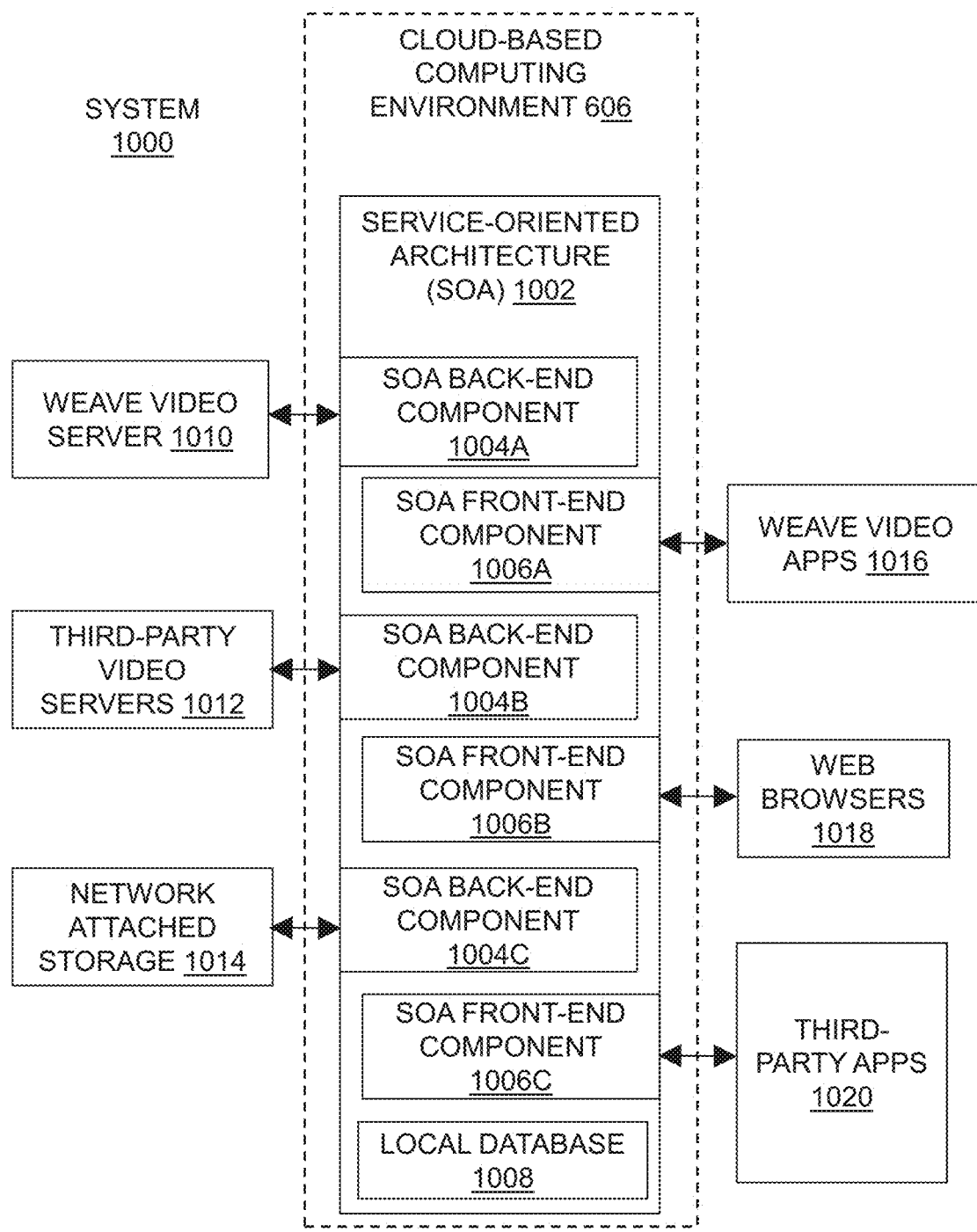
FIG. 10 depicts a system 700 illustrating a further embodiment of the weave video system.

FIG. 10 depicts a system 1000 illustrating a further embodiment of the weave video system. The system 1000 includes a service-oriented architecture (SOA) 1002 implemented within a cloud-based computing environment 606. The SOA 1002 provides a collection of services, wherein the services communicate with each other. The communications may range from simple exchanges of data to two or more services coordinating one or more activities. Each service may be a function that is self-contained and well-defined. Each service may not depend on a state or context of each of the other services.

The SOA 1002 includes SOA back-end components 1004A-C and front-end components 1006A-C for facilitating one or more users in generating, annotating, sharing, and viewing tile videos and/or weave videos. The SOA also includes a local database 1008. In some embodiments, the local database 1008 may be an open source database such as the MongoDB® database, the PostgreSQL® database, or the like. An additional front-end component (not shown in FIG. 10) may be configured to provide an administrator access secure web portal. The administrator access secure web portal may be configured to provide status and control of the operable SOA solution.

The SOA back-end component 1004A is configured to communicate with at least one weave video server 1010. The SOA back-end component 1004B is configured to communicate with at least one third-party video server 1012, such as a YouTube® server or other server where game videos are stored. The SOA back-end component 1004C is configured to communicate with network attached storage 1014. In some embodiments the SOA back-end components 1004A-C may also use one or more transfer protocols such as a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), or a remote direct memory access (RDMA) transfer protocol.

The SOA front-end component 1006A is configured to communicate with a plurality of weave video applications 1016 installed on a plurality of client devices. The SOA front-end component 1006B is configured to communicate with a plurality of web browsers 1018 installed on a plurality of client devices. The SOA front-end component 1006C is configured to communicate with a plurality of third-party applications 1020 installed on a plurality of client devices. The client devices may be any of the previously described client device.

The SOA 1002 may be implemented on one or more servers. The SOA 1002 may include a non-transitory computer readable medium including a plurality of machine-readable instructions which when executed by one or more processors of the one or more servers are adapted to cause the one or more servers to perform a method of segmenting and annotating videos of sporting events for player performance analysis. The method may include the methods described in FIG. 4A, FIG. 4B, and/or FIG. 4C.

In one embodiment, the SOA 1002 may be implemented on a virtual (i.e. software implemented) server in a cloud computing environment. An Ubuntu® server may provide the virtual server and may be implemented as a separated operating system (OS) running on one or more physical (i.e. hardware implemented) servers. Any applicable virtual server may by be used for the Ubuntu® Server function. The Ubuntu® Server function may be implemented in the Microsoft Azure®, the Amazon Web Services® (AWS), or the like cloud computing data center environments. In other embodiments, the SOA 1002 may be implemented on one or more servers in a networked computing environment located within a business premise or another data center. In some embodiments, the SOA 1002 may be implemented within a virtual container, for example the Docker® virtual container.

In summary, the SOA front-end components are operable to be combined with the SOA back-end components of FIG. 10 to form an operable SOA solution. The SOA of system 1000 transforms the one or more servers into a machine that solves the problem of quickly segmenting a game tape for analysis by multiple players and/or coaching staff.

As will be appreciated by one skilled in the art, aspects of the technology described herein may be embodied as a system, method or computer program product. Accordingly, aspects of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technology may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the technology described herein may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technology described herein refer to flow-chart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technology described herein. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description provided herein has been presented for purposes of illustration and description, but is not intended to be exhaustive or limited to the specific form disclosed. Many modifications and variations will be apparent to those of ordinary skill in the art without departing from the scope and spirit of the disclosure. The embodiment was chosen and described in order to best explain the principles described herein and the practical application of those principles, and to enable others of ordinary skill in the art to understand the technology for various embodiments with various modifications as are suited to the particular use contemplated.

The descriptions of the various embodiments of the technology disclosed herein have been presented for purposes of illustration, but these descriptions are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server comprising:
   a memory;
   a database; and
   a processor configured to perform a method of video segmentation and annotation for analysis, the method comprising:
   receiving an upload comprising a video file of an event;
   storing the received video file in the database;
   receiving input from a generating user that includes a first timestamp indicating a first moment in the video file, the first moment being a still frame of the video file;
   storing the first timestamp in the database in association with the video file;
   generating a first tile video in response to the received input from the generating user, wherein the first tile video comprises a pre-context of a pre-determined number of seconds of the video file immediately prior to the first moment indicated by the first timestamp, a post-context of a pre-determined number of seconds of the video file immediately subsequent to the first moment indicated by the first timestamp, and the first moment indicated by the first timestamp;
   receiving input from the generating user that includes a second timestamp indicating a second moment in the video file, the second moment being a still frame of the video file;
   storing the first timestamp in the database in association with the video file;
   generating a second tile video in response to the received input from the generating user, wherein the second tile video comprises a pre-context of a pre-determined number of seconds of the video file immediately prior to the second moment indicated by the second timestamp, a post-context of a pre-determined number of seconds of the video file immediately subsequent to the second moment indicated by the second timestamp, and the second moment indicated by the second timestamp;
   merging the first tile video and the second tile video into an ordered weave video, wherein the order of the tile videos in the ordered weave video is specified by the generating user;
   receiving, from a viewing user, an annotation associated with a tile video of the ordered weave video, wherein the annotation includes a drawing overlaid on the tile video; and
   storing the annotation in association with the tile video of the weave video such that the annotation is displayed in association with the tile video when the weave video is played by viewing user; and
   transmitting the ordered weave video to one or more of a plurality of viewing users.

2. The server of claim 1, wherein the annotation further includes a comment associated with the tile video, or a tag associated with the tile video.

3. The server of claim 1, wherein the pre-context comprises 3 seconds immediately prior to the moment indicated by the timestamp.

4. The server of claim 1, wherein the post-context comprises 3 seconds immediately subsequent to the moment indicated by the timestamp.

5. The server of claim 1, wherein the first tile video is associated with a first threaded conversation related to the first tile video, wherein the first threaded conversation is stored in the database.

6. A method of video segmentation and annotation for analysis, the method comprising:
   receiving an upload comprising a video file of an event;
   storing the received video file in the database;

receiving input from a generating user that includes a first timestamp indicating a first moment in the video file, the first moment being a still frame of the video file;

storing the first timestamp in the database in association with the video file;

generating a first tile video in response to the received input from the generating user, wherein the first tile video comprises a pre-context of a pre-determined number of seconds of the video file immediately prior to the first moment indicated by the first timestamp, a post-context of a pre-determined number of seconds of the video file immediately subsequent to the first moment indicated by the first timestamp, and the first moment indicated by the first timestamp;

receiving input from the generating user that includes a second timestamp indicating a second moment in the video file, the second moment being a still frame of the video file;

storing the first timestamp in the database in association with the video file;

generating a second tile video in response to the received input from the generating user, wherein the second tile video comprises a pre-context of a pre-determined number of seconds of the video file immediately prior to the second moment indicated by the second timestamp, a post-context of a pre-determined number of seconds of the video file immediately subsequent to the second moment indicated by the second timestamp, and the second moment indicated by the second timestamp;

merging the first tile video and the second tile video into an ordered weave video, wherein the order of the tile videos in the ordered weave video is specified by the generating user;

receiving, from a viewing user, an annotation associated with a tile video of the ordered weave video, wherein the annotation includes a drawing overlaid on the tile video; and storing the annotation in association with the tile video of the weave video such that the annotation is displayed in association with the tile video when the weave video is played by viewing user; and transmitting the ordered weave video to one or more of a plurality of viewing users.

7. The method of claim 6, wherein the annotation further includes a comment associated with the tile video, or a tag associated with the tile video.

8. The method of claim 6, wherein the pre-context comprises 3 seconds immediately prior to the moment indicated by the timestamp.

9. The method of claim 6, wherein the post-context comprises 3 seconds immediately subsequent to the moment indicated by the timestamp.

10. The method of claim 6, wherein the first tile video is associated with a first threaded conversation related to the first tile video, wherein the first threaded conversation is stored in the database.

\* \* \* \* \*